US012698164B2

(12) United States Patent
Xu et al.

(10) Patent No.: US 12,698,164 B2
(45) Date of Patent: Aug. 4, 2026

(54) PRE-STACKING DEVICE, PRE-STACKING METHOD, AND BATTERY PROCESSING EQUIPMENT

(71) Applicant: CONTEMPORARY AMPEREX TECHNOLOGY CO., LIMITED, Ningde (CN)

(72) Inventors: Yanjun Xu, Ningde (CN); Panze Zheng, Ningde (CN); Ben Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 231 days.

(21) Appl. No.: 18/409,022

(22) Filed: Jan. 10, 2024

(65) Prior Publication Data

US 2024/0425302 A1     Dec. 26, 2024

Related U.S. Application Data

(63) Continuation of application No. PCT/CN2023/101782, filed on Jun. 21, 2023.

(51) Int. Cl.
B65G 47/90          (2006.01)
B65G 61/00          (2006.01)
(Continued)

(52) U.S. Cl.
CPC ........... B65G 47/904 (2013.01); B65G 61/00 (2013.01); H01M 50/209 (2021.01); H01M 50/244 (2021.01)

(58) Field of Classification Search
CPC ... B65G 47/904; B65G 61/00; H01M 50/209; H01M 50/244; H01M 10/0404; Y02E 60/10; Y02P 70/50
See application file for complete search history.

(56) References Cited

U.S. PATENT DOCUMENTS

2019/0348650 A1*  11/2019  Nakamoto ........ H01M 10/0481
2019/0363393 A1   11/2019  Hashem et al.
2022/0131176 A1    4/2022  Sale et al.

FOREIGN PATENT DOCUMENTS

CN        208522043 U     2/2019
CN        210092240 U     2/2020
(Continued)

OTHER PUBLICATIONS

"English Translation of CN210092240U", Translated on Oct. 9, 2025, (Year: 2025).*
(Continued)

*Primary Examiner* — Wade Miles
*Assistant Examiner* — Jaewook Jung
(74) *Attorney, Agent, or Firm* — ANOVA LAW GROUP, PLLC

(57)                    ABSTRACT

The present application relates to a pre-stacking device, a pre-stacking method, and a battery processing equipment. The pre-stacking device includes: at least two conveying members, each having at least two bearing positions for placing battery cells; a pre-stacking platform with a stacking station; and a gripping mechanism arranged between the pre-stacking platform and all the conveying members to move the battery cells on each of the conveying members to the stacking station; the gripping mechanism being configured to be capable of gripping corresponding battery cells from each of the conveying members according to a preset battery-cell polarity combination mode.

5 Claims, 5 Drawing Sheets

(51) Int. Cl.
*H01M 50/209* (2021.01)
*H01M 50/244* (2021.01)

(56) References Cited

FOREIGN PATENT DOCUMENTS

| | | | |
|---|---|---|---|
| CN | 211530116 U | | 9/2020 |
| CN | 211970964 U | * | 11/2020 |
| CN | 112585793 A | | 3/2021 |
| CN | 218472011 U | | 2/2023 |
| DE | 102017216213 A1 | | 3/2019 |
| KR | 20210037328 A | | 4/2021 |

OTHER PUBLICATIONS

"English Translation of CN211970964U", Translated on Oct. 9, 2025, (Year: 2025).*
"English Translation of CN218472011U", Translated on Oct. 9, 2025, (Year: 2025).*
The European Patent Office (EPO) The Extended European Search Report for Application No. 23832949.4 Feb. 7, 2025 94 Pages.
The World Intellectual Property Organization (WIPO) International Search Report and Written opinion for PCT/CN2023/101782 Dec. 4, 2023 16 pages (including English translation).

\* cited by examiner

100

PRE-STACKING DEVICE, PRE-STACKING METHOD, AND BATTERY PROCESSING EQUIPMENT

CROSS-REFERENCE TO RELATED APPLICATION

This application is a continuation of International Application No. PCT/CN2023/101782, filed on Jun. 21, 2023, the entire content of which is incorporated herein by reference.

TECHNICAL FIELD

The present application relates to the technical field of batteries and in particular to a pre-stacking device, a pre-stacking method, and a battery processing equipment.

BACKGROUND

In the battery production process, it is necessary to pre-stack multiple battery cells, and then assemble the pre-stacked battery cells to finally form a battery module or battery.

When the battery cells are being stacked and arranged, different battery cell configurations will be produced according to different polarity arrangements, so that the finally formed battery modules or batteries also have different configurations.

However, in the current battery cell stacking process, only the stacking and arrangement of the battery cells can be realized, but the stacking and combination of different battery cell configurations cannot be realized according to different requirements in production, thereby affecting the efficiency of battery production.

SUMMARY OF THE INVENTION

In view of this, the present application provides a pre-stacking device, a pre-stacking method, and a battery processing equipment.

In a first aspect, the present application provides a pre-stacking device, including:

at least two conveying members, each having at least two bearing positions for placing battery cells;

a pre-stacking platform with a stacking station; and a gripping mechanism arranged between the pre-stacking platform and all the conveying members to move the battery cells on the conveying members to the stacking station; where the gripping mechanism is configured to be capable of gripping corresponding battery cells from each conveying member according to a preset battery-cell polarity combination mode.

In the technical solution of the embodiment of the present application, the gripping mechanism can grip the corresponding battery cells from each conveying member according to the preset battery-cell polarity combination mode, so that multiple battery cells can be directly stacked and arranged on the stacking station according to the polarity combination mode required for production to realize pre-stacking of the battery cells, thereby improving the efficiency of battery cell pre-stacking and the efficiency of battery production.

In some embodiments, the conveying member includes a first conveying member and a second conveying member, and the polarity of the battery cells on the first conveying member is opposite to that of the battery cells on the second conveying member.

The gripping mechanism is configured to be capable of gripping battery cells with sticked tape and having different polarities from the first conveying member and the second conveying member respectively according to the preset battery-cell polarity combination mode.

In the technical solution of the embodiment of the present application, the first conveying member and the second conveying member can respectively provide battery cells with opposite polarities, so that the gripping mechanism can grip the battery cells with opposite polarities from the first conveying member and the second conveying member respectively and place them on the stacking station for arrangement, such that the battery cells pre-stacked according to the preset battery-cell polarity combination mode are formed on the stacking station, so as to facilitate assembly thereof.

In some embodiments, the bearing positions on the first conveying member and the second conveying member are both used to place battery cells with sticked tape. When the battery cells are moved to the stacking station, two adjacent battery cells can be bonded and fixed to each other by the sticked tape.

In some embodiments, the conveying member further includes a third conveying member, the bearing positions on the third conveying member being used for placing battery cells without sticked tape;

where the third conveying member is arranged on at least one side of the gripping mechanism, and the gripping mechanism is configured to be capable of gripping the battery cells without sticked tape from the third conveying member according to the preset battery-cell polarity combination mode, and mating and stacking the battery cells without sticked tape with the battery cells with sticked tape.

In the technical solution of the embodiment of the present application, the third conveying member can provide a single battery cell without sticked tape to be mated with the battery cells with sticked tape on the first conveying member and the second conveying member, so as to be arranged and assembled together to form a battery module or battery.

In some embodiments, the gripping mechanism includes a first driving member, a connecting member and a gripping member. The gripping member is arranged on the connecting member and is used to grip the battery cells. The first driving member is drivably connected to the connecting member. The first driving member is configured to be capable of driving the connecting member to turn over and bringing the battery cells on the gripping member to turn over.

In the technical solution of the embodiment of the present application, by providing the gripping member, gripping and releasing of the battery cells can be realized so as to place the battery cells on the stacking station. By providing the first driving member, the gripped battery cells can be brought along to turn over, so that the battery cells can turn over from the flat state on the bearing position to the state with the electrode terminals facing upwards, so as to facilitate stacking and arrangement on the stacking station.

In some embodiments, the gripping member includes at least two sub-members arranged at intervals along a first direction on the connecting member, and each sub-member includes at least two jaws arranged at intervals along a second direction intersecting the first direction;

where each jaw in at least one sub-member is rotatably arranged on the connecting member.

In the technical solution of the embodiment of the present application, through the above-mentioned structure, the surfaces on the side with sticked tape of all the battery cells gripped by the gripping member can be arranged to face the same direction by rotation, so that when the battery cells are placed on the stacking station, every two adjacent battery cells can be bonded and fixed to each other by the sticked tape.

In some embodiments, each jaw includes two clamping members arranged at an interval along the second direction, where at least one of the clamping members is movably arranged on the connecting member along the second direction.

In the technical solution of the embodiment of the present application, the clamping members move along the second direction, such that the distance between the two clamping members in the second direction can be adjusted, so that each jaw can be used to clamp a battery cell of a different dimension.

In some embodiments, all the jaws in at least one sub-member are movably arranged along the first direction.

In the technical solution of the embodiment of the present application, through the above-mentioned structure, before the battery cells are placed on the stacking station, first the distance between the adjacent battery cells in the first direction is adjusted by moving the jaws, so that the battery cells can be placed on the stacking station more smoothly.

In some embodiments, the pre-stacking platform includes a base, a supporting member and a pressing mechanism, the supporting member is rotatably arranged on the base, and the pressing mechanism is arranged on the base and located on one side of the supporting member;

where at least two stacking stations are arranged at intervals on the supporting member along the circumferential direction thereof, and the supporting member is configured to be capable of allowing a different stacking station to be arranged opposite to the pressing mechanism through rotation; the pressing mechanism is used to exert a force on the battery cells in the stacking station opposite to the pressing mechanism that causes the battery cells to approach each other along the arrangement direction of the battery cells.

In the technical solutions of the embodiment of the present application, multiple stacking stations are provided on the supporting member, so that stacking of multiple groups of battery cells can be realized simultaneously, thereby improving the stacking efficiency. In addition, through the rotation of the supporting member, the stacking stations thereon are brought along to be arranged opposite to the pressing mechanism in sequence, and the pressing mechanism can exert a force on the battery cells in the stacking station opposite to the pressing mechanism that causes the battery cells to approach each other along the arrangement direction of the battery cells, so that the multiple battery cells can be adhered to each other and bonded and fixed to each other by the sticked tape.

In a second aspect, the present application provides a battery processing equipment including the above-mentioned pre-stacking device.

In a third aspect, the present application provides a pre-stacking method, including the steps of:

acquiring a preset battery-cell polarity combination mode; and in response to the acquired battery-cell polarity combination mode, controlling a gripping mechanism to grip corresponding battery cells from each conveying member and place them on a stacking station.

In some embodiments, the step of acquiring a preset battery-cell polarity combination mode further includes:

acquiring a first polarity combination mode, where in the first polarity combination mode, the polarities of the adjacent battery cells are alternately arranged.

In some embodiments, the step of in response to the acquired battery-cell polarity combination mode, controlling a gripping mechanism to grip corresponding battery cells from each conveying member and place them on a stacking station further includes:

in response to the acquired first polarity combination mode, gripping a group of battery cells from the first conveying member and placing them on the stacking station, and gripping a group of battery cells from the second conveying member and placing them on the stacking station;

repeating the above gripping action until the free position for a group of battery cells remains on the stacking station; and gripping a group of battery cells from the third conveying member and placing them in the free position on the stacking station, where the polarity of the group of battery cells gripped from the third conveying member is opposite to that of the group of battery cells adjacent thereto.

In some embodiments, the step of acquiring a preset battery-cell polarity combination mode further includes:

acquiring a second polarity combination mode, where in the second polarity combination mode, two adjacent battery cells are treated as a unit, and the polarities of the adjacent units are alternately arranged.

In some embodiments, the step of in response to the acquired battery-cell polarity combination mode, controlling a gripping mechanism to grip corresponding battery cells from each conveying member and place them on a stacking station further includes:

in response to the acquired second polarity combination mode, gripping two groups of battery cells from the first conveying member and placing them on the stacking station, and gripping two groups of battery cells from the second conveying member and placing them on the stacking station;

repeating the above gripping action until the free position for a group of battery cells remains on the stacking station; and gripping a group of battery cells from the third conveying member and placing them in the free position on the stacking station, where the polarity of the group of battery cells gripped from the third conveying member is the same as that of the group of battery cells adjacent thereto.

In some embodiments, the step of in response to the acquired battery-cell polarity combination mode, controlling a gripping mechanism to grip corresponding battery cells from each conveying member and place them on a stacking station further includes:

controlling the gripping mechanism to bring the battery cells thereon to turn over, so that the battery cells turn over from the flat state to the state with the electrode terminals facing upwards;

rotating the battery cells on the gripping mechanism so that the sticked tape on each battery cell faces the same direction; and placing the battery cells on the stacking station in the state with the electrode terminals facing upwards.

In some embodiments, after the step of in response to the acquired battery-cell polarity combination mode, controlling the gripping mechanism to grip corresponding battery cells from each conveying member and place them on the stacking station, the method further includes the steps of:

controlling the supporting member to rotate so that one of the stacking stations on the supporting member having battery cells placed thereon is arranged opposite to the pressing mechanism; and controlling the pressing mechanism to exert a force to the battery cells in the stacking station opposite to the pressing mechanism that causes the battery cells to approach each other along the arrangement direction of the battery cells.

The above description is only a summary of the technical solutions of the present application. To make the technical means of the present application clearer and implementable in accordance with the disclosure of the specification, and to make the above and other objectives, features and advantages of the present application more comprehensible, specific implementations of the present application are provided below.

DESCRIPTION OF DRAWINGS

Various other advantages and benefits will become apparent to those of ordinary skill in the art upon reading the following detailed description of the implementations. The drawings are intended for the purpose of illustrating the implementations only and shall not be construed as limitation of the present application. Also, the same components are denoted by the same reference numerals throughout the drawings. In the drawings.

Figure 1:
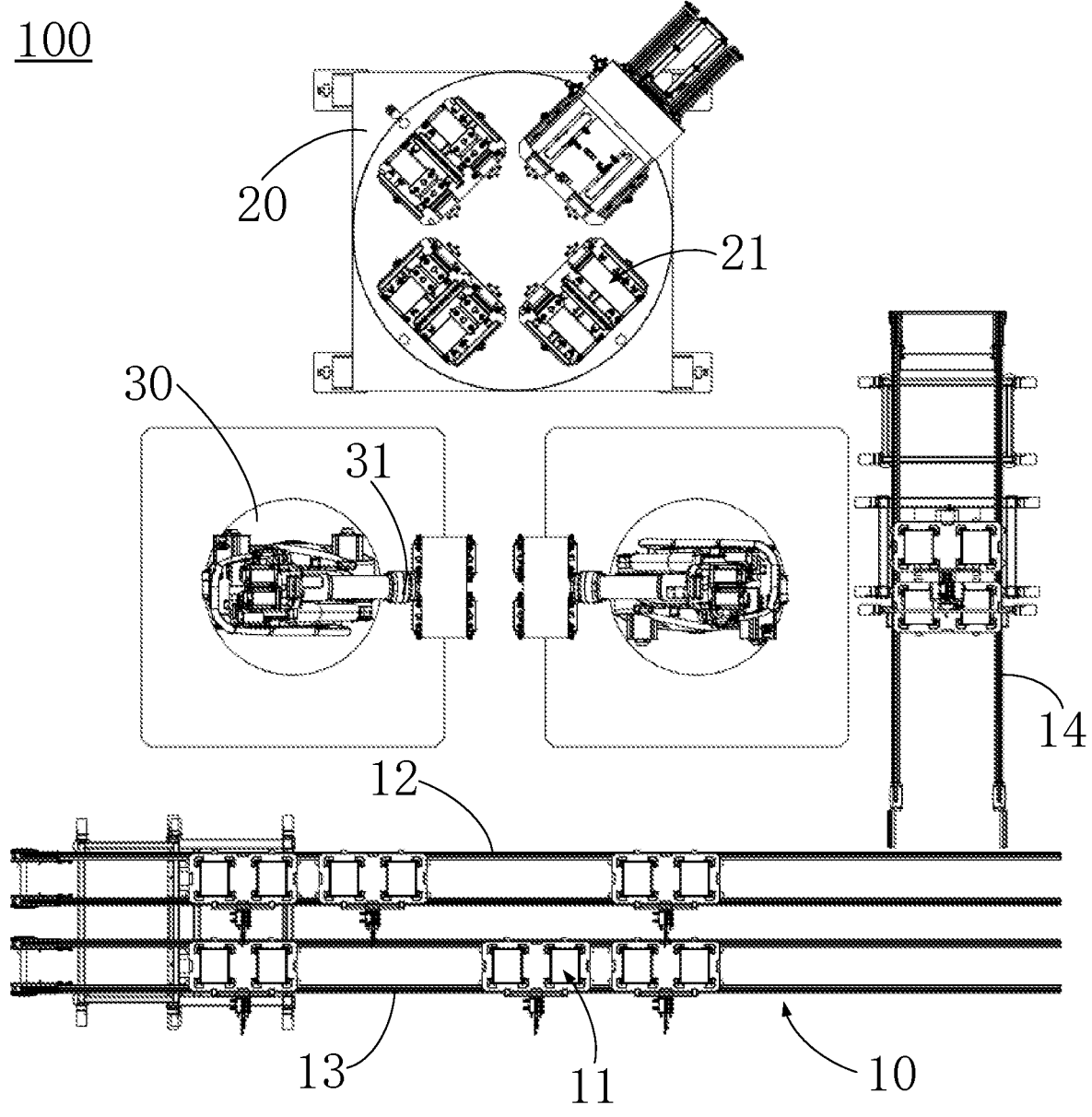
FIG. 1 is a schematic overall structural view of a pre-stacking device according to one or more embodiments.

100. pre-stacking device; 10. conveying member; 20. pre-stacking platform; 30. gripping mechanism; 11. bearing position; 12. first conveying member; 13. second conveying member; 14. third conveying member; 21. stacking station; 22. base; 23. supporting member; 24. pressing mechanism; 31. first driving member; 32. connecting member; 33. gripping member; 321. rotating shaft; 322. second driving member; 331. sub-member; 332. jaw; 3321. clamping member; a. first direction; b. second direction.

DETAILED DESCRIPTION

Embodiments of the technical solutions of the present application will be described in detail below in conjunction with the drawings. The following embodiments are merely intended to illustrate the technical solutions of the present application more clearly, and therefore are only used as examples and shall not be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientation or position relationship indicated by the technical terms "central," "longitudinal," "transverse," "length," "width," "thickness," "upper," "lower," "front," "back," "left," "right," "vertical," "horizontal," "top," "bottom," "inner," "outer," "clockwise," "counterclockwise," "axial," "radial," "circumferential," etc. are based on the orientation or position relationship shown in the drawings and are intended to facilitate the description of the embodiments of the present application and simplify the description only, rather than indicating or implying that the device or element referred to must have a particular orientation or be constructed and operated in a particular orientation, and therefore are not to be interpreted as limitations on the embodiments of the present application.

In the description of the embodiments of the present application, unless otherwise expressly specified and limited, the technical terms "mount," "join," "connect," "fix," etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

At present, from the perspective of the development of the market situation, power batteries are more and more widely used. The power batteries are used in energy storage power source systems such as hydraulic, thermal, wind and solar power stations as well as in electric vehicles such as electric bicycles, electric motorcycles and electric cars, and other fields. With the continuous expansion of the application field of the power batteries, the market demand is also constantly expanding.

A battery cell is the smallest unit that makes up a battery. Specifically, multiple battery cells can be connected in series, in parallel or in parallel-series connection to form a battery module, and then one or more battery modules are connected and assembled into a battery. Of course, multiple battery cells can also be directly assembled into a battery. The parallel-series connection means that the multiple battery cells are connected in both series and parallel.

In the process of assembling to form a battery module or battery, depending on the varying polarity combination mode between multiple battery cells, a variety of battery modules or batteries with different specifications can be formed. For example, every two adjacent battery cells have opposite polarities and are alternately arranged. This combination mode of battery cells is generally called 1P. Taking two adjacent battery cells as a unit, the polarities of the battery cells in every two adjacent units are opposite and are alternately arranged. This combination mode of battery cells is generally called 2P, and so on.

Therefore, when the battery-cell polarity combination mode required for production is different, the arrangement of the battery cells is also different. However, at present, in pre-stacking of the battery cells, only stacking and arrangement of the battery cells can be realized, and flexible arrangement cannot be made according to the required battery-cell polarity combination mode. This leads to the fact that the pre-stacked battery cells need to be arranged manually, or in other ways, according to the battery-cell polarity combination mode required for production, which has significant impact on the production efficiency of batteries.

In view of this, in order to solve the problem that in the current pre-stacking process of battery cells, the arrangement of battery cells in different polarity combination modes cannot be realized according to production requirements, thereby impacting the production efficiency of batteries, one or more embodiments of the present application provide a pre-stacking device, in which battery cells with different polarities are respectively conveyed by at least two conveying members, and the gripping mechanism can grip corresponding battery cells from different conveying members according to the preset battery-cell polarity combination mode and place them on the stacking station, so that multiple battery cells can be arranged on the stacking station directly according to the preset battery-cell polarity combination mode, thereby effectively improving the efficiency of battery cell stacking and the efficiency of battery production.

Referring to FIG. 1, according to one or more embodiments, the present application provides a pre-stacking device 100, including at least two conveying members 10, a pre-stacking platform 20 and a gripping mechanism 30. Each conveying member 10 has at least two bearing positions 11 for placing battery cells, and the pre-stacking platform 20 is provided with a stacking station 21. The gripping mechanism 30 is arranged between the pre-stacking platform 20 and all the conveying members 10 to move the battery cell on each conveying member 10 to the stacking station 21. The gripping mechanism 30 is configured to be capable of gripping the corresponding battery cells from each conveying member 10 according to a preset battery-cell polarity combination mode.

It should be noted that the conveying member 10 refers to a structure that can be used to bear the battery cells and move the battery cells from the previous process or other positions to the target position. Specifically, the conveying member 10 may include, but is not limited to, a conveying rail and at least two support plates movably arranged on the conveying rail, and each support plate is formed with a bearing position 11 for placing a battery cell. When the support plate moves along the conveying rail, it brings the battery cells thereon to move synchronously.

The pre-stacking platform 20 refers to a structure capable of bearing multiple battery cells and providing a stacking space for the multiple battery cells thereon. Specifically, multiple stacking stations 21 can be provided on the pre-stacking platform 20, and each stacking station 21 can realize the pre-stacking of a group of battery cells, and with multiple stacking stations 21, the stacking of multiple groups of battery cells can be realized simultaneously, which improves the pre-stacking efficiency.

The gripping mechanism 30 refers to a structure capable of bringing the battery cell to move and placing the battery cell at a target position. The gripping mechanism 30 is arranged between the pre-stacking platform 20 and all the conveying members 10, which can facilitate gripping the battery cells from the conveying members 10 respectively and then placing the gripped battery cells on the stacking station 21 by the gripping mechanism 30.

Figure 2:
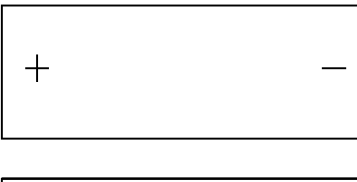
FIG. 2 is a schematic view of battery cells arranged in a first polarity combination mode according to one or more embodiments.
Figure 2:
Figure 2:
Figure 2:
Figure 3:
FIG. 3 is a schematic view of battery cells arranged in a second polarity combination mode according to one or more embodiments.
Figure 3:
Figure 3:
Figure 3:

Furthermore, when multiple battery cells are stacked and arranged along their thickness direction, the positions of the positive and negative electrodes of each battery cell are different, so that different battery-cell polarity combination modes will be formed. As shown in FIG. 2, for example, four battery cells are stacked along their thickness direction. The positive electrode of the first battery cell is on the left and the negative electrode is on the right. The positive electrode of the second battery cell is on the right and the negative electrode is on the left. The positive electrode of the third battery cell is on the left and the negative electrode is on the right. The positive electrode of the fourth battery cell is on the right and the negative electrode is on the left. Thus, a battery-cell polarity combination mode can be formed. As shown in FIG. 3, in contrast, the positive electrode of the first battery cell is on the left and the negative electrode is on the right. The positive electrode of the second battery cell is on the left and the negative electrode is on the right. The positive electrode of the third battery cell is on the right and the negative electrode is on the left. The positive electrode of the fourth battery cell is on the right and the negative electrode is on the left. Thus, another different battery-cell polarity combination mode can be formed.

Therefore, the preset battery-cell polarity combination mode means that the positive electrodes and negative electrodes of multiple battery cells are arranged according to preset rules.

With the structure described above, the gripping mechanism 30 can grip the corresponding battery cells from each conveying member 10 according to the preset battery-cell polarity combination mode, so that the multiple battery cells are directly stacked and arranged on the stacking station 21 according to the battery-cell polarity combination mode required for production to realize pre-stacking of the battery cells, thereby improving the efficiency of battery cell pre-stacking and the efficiency of battery production.

In some embodiments, the conveying member 10 includes a first conveying member 12 and a second conveying member 13, and the polarity of the battery cell on the first conveying member 12 is opposite to that of the battery cell on the second conveying member 13. The gripping mechanism 30 is configured to be capable of gripping battery cells with sticked tape and having different polarities from the first conveying member 12 and the second conveying member 13 according to the preset battery-cell polarity combination mode.

It should be noted that the battery cell on the first conveying member 12 and the battery cell on the second conveying member 13 having opposite polarities means that the positive electrode of the battery cell on the first conveying member 12 is on the right, then the positive electrode of the battery cell on the second conveying member 13 is on the left. For example, the first battery cell and the second battery cell are arranged to have opposite polarities in FIG. 2, whereas the first battery cell and the second battery cell are arranged to have the same polarity in FIG. 3.

Specifically, the first conveying member 12 and the second conveying member 13 are arranged on the same side of the gripping mechanism 30, and the first conveying member 12 and the second conveying member 13 are arranged parallel to each other. The pre-stacking platform 20 is arranged on the other side of the gripping mechanism 30, and the battery cells are gripped from the first conveying member 12 and the second conveying member 13 respectively and then placed on the stacking station 21 for arrangement by the gripping mechanism 30.

Further, the polarity of the battery cell on the first conveying member 12 is opposite to that of the battery cell on the second conveying member 13. That is, when the positive electrode of the battery cell on the first conveying member 12 is on the left and the negative electrode is on the right, the positive electrode of the battery cell on the second conveying member 13 is on the right and the negative electrode is on the left. Or, when the positive electrode of the battery cell on the first conveying member 12 is on the right and the negative electrode is on the left, the positive electrode of the battery cell on the second conveying member 13 is on the left and the negative electrode is on the right.

Thus, the gripping mechanism 30 can select and grip different numbers of battery cells from the first conveying member 12 and the second conveying member 13 according to the preset battery-cell polarity combination mode, and then arrange them in order on the stacking station 21, so as to form the preset battery-cell polarity combination mode.

For example, the gripping mechanism 30 can grip one battery cell from the first conveying member 12 and the second conveying member 13 respectively, and grip twice continuously, then when the battery cells are arranged on the stacking station 21, the polarities of every two adjacent battery cells are opposite and are alternately arranged. As another example, the gripping mechanism 30 can first grip two battery cells from the first conveying member 12 and place them on the stacking station 21, and then grip two battery cells from the second conveying member 13 and place them on the stacking station 21. As such, when the battery cells are arranged on the stacking station 21, two adjacent battery cells form a unit, and the two battery cells in each unit have the same polarity, and the polarities of every two adjacent units are opposite and are alternately arranged.

The first conveying member 12 and the second conveying member 13 can respectively provide battery cells with opposite polarities, so that the gripping mechanism 30 can grip the battery cells with opposite polarities from the first conveying member 12 and the second conveying member 13 respectively and place them on the stacking station 21 for arrangement, such that the battery cells pre-stacked according to the preset battery-cell polarity combination mode are formed on the stacking station 21, so as to facilitate assembly thereof.

In some embodiments, the bearing positions 11 on the first conveying member 12 and the second conveying member 13 are used for placing battery cells with sticked tape.

Specifically, the battery cells placed on the first conveying member 12 and the second conveying member 13 are all battery cells with sticked tape, that is, the battery cells are laid flat on the bearing positions 11 of the first conveying member 12 and the second conveying member 13 with the large surfaces facing upwards, and the tape is sticked onto the large surfaces facing upwards. Said large surface refers to the surface on the side with the largest surface area of the battery cell.

Since the battery cells on the first conveying member 12 and the second conveying member 13 are all sticked with tape, when the gripping mechanism 30 places the battery cells on the stacking station 21 for pre-stacking, the adjacent battery cells can be bonded and fixed to each other via the tape on the large surfaces, so as to realize tight connection between multiple battery cells.

In some embodiments, the conveying member 10 further includes a third conveying member 14 and the bearing position 11 on the third conveying member 14 is used for placing battery cells without sticked tape. The third conveying member 14 is arranged on at least one side of the gripping mechanism 30 and the gripping mechanism 30 is configured to be capable of gripping the battery cells without sticked tape from the third conveying member 14 according to the preset battery-cell polarity combination mode, and mating and stacking the battery cells without sticked tape with the battery cells with sticked tape.

It should be noted that when multiple battery cells are arranged on the stacking station 21, two adjacent battery cells can be bonded and fixed to each other by the sticked tape on the large surface of the previous battery cell. Therefore, it is not necessary to stick tape onto the last battery cell.

When the gripping mechanism 30 grips multiple battery cells to be stacked and arranged, if it is necessary to realize the stacking and arrangement of N battery cells, then the gripping mechanism 30 grips a total number of N−1 of battery cells from the first conveying member 12 and the second conveying member 13 and the last battery cell from the third conveying member 14. As such, the arrangement of N battery cells can be realized, and every two adjacent battery cells are bonded and fixed to each other by the sticked tape.

Specifically, the third conveying member 14 is arranged perpendicular to the first conveying member 12 and the second conveying member 13, and the gripping mechanism 30 is arranged in a space enclosed jointly by the first conveying member 12, the second conveying member 13, the third conveying member 14 and the pre-stacking platform 20, so that the gripping mechanism 30 can grip the battery cells from the first conveying member 12, the second conveying member 13 and the third conveying member 14 respectively, and then place them on the pre-stacking platform 20.

The third conveying member 14 can provide a single battery cell without sticked tape to be mated with the battery cells with sticked tape on the first conveying member 12 and the second conveying member 13, so as to be arranged and assembled together to form a battery module or battery.

Figure 4:
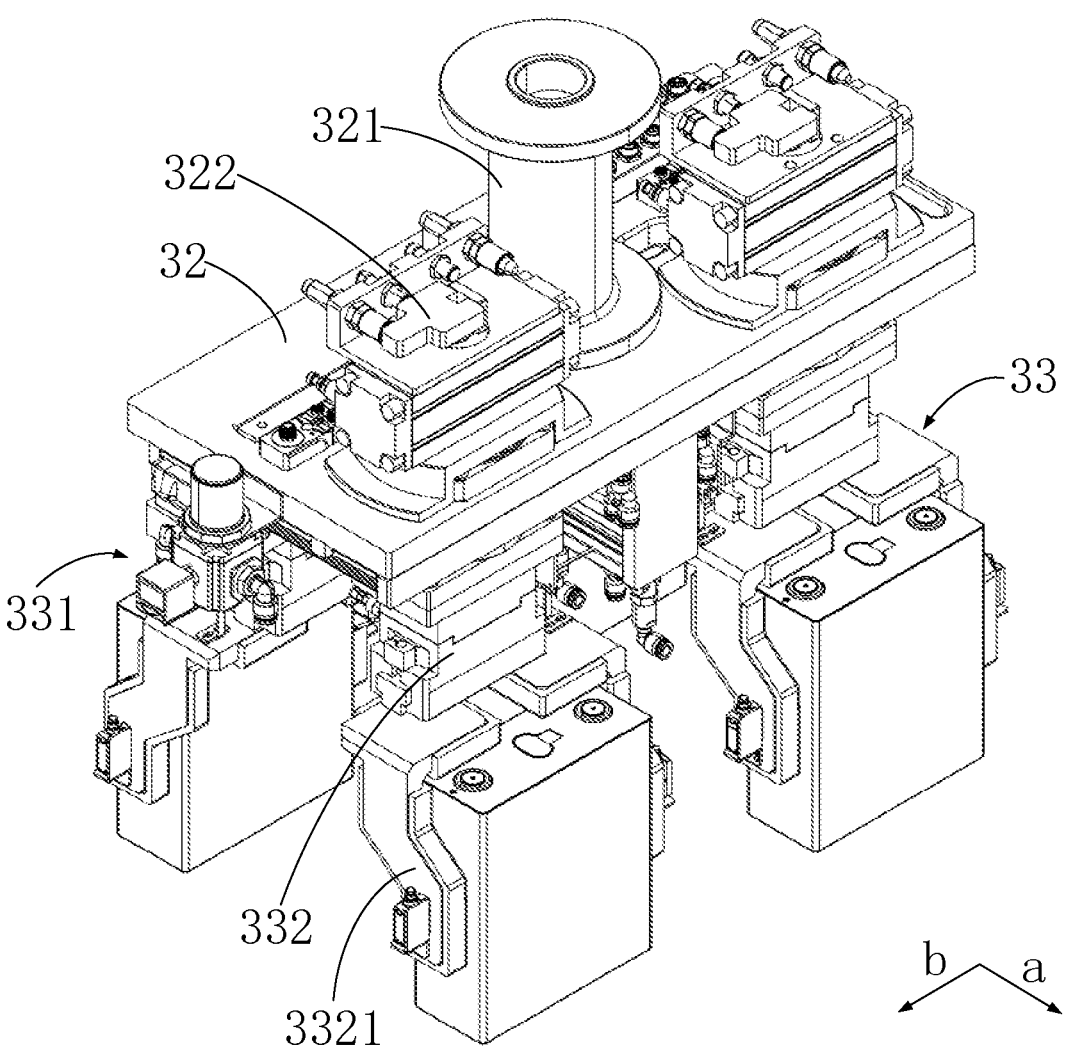
FIG. 4 is a schematic structural view of a gripping mechanism in a pre-stacking device according to one or more embodiments.

Refer to FIG. 1 and FIG. 4 together. In some embodiments, the gripping mechanism 30 includes a first driving member 31, a connecting member 32 and a gripping member 33. The gripping member 33 is arranged on the connecting member 32 and is used to grip the battery cells. The first driving member 31 is drivably connected to the connecting member 32, and the first driving member 31 is configured to be capable of driving the connecting member 32 to turn over and bringing the battery cells on the gripping member 33 to turn over.

It should be noted that the battery cells are kept in a flat state on the bearing positions 11 of the first conveying member 12, the second conveying member 13, and the third conveying member 14, with the large surfaces facing upwards. On the one hand, the battery cells laid flat can be more stable during movement, and on the other hand, it also facilitates arranging the large surface on the side with sticked tape of the battery cell to face upwards.

Therefore, when the gripping mechanism 30 grips the battery cell, the battery cell is still in the flat state. The first driving member 31 drives the connecting member 32 to turn over by 90°, thereby bringing the gripping member 33 on the connecting member 32 and the battery cell to turn over synchronously, so that the battery cell turns over from the flat state to the state with the electrode terminals facing upwards, such that the battery cells are placed on the stacking station 21 and stacked.

Specifically, the first driving member 31 may be, without limitation, provided as a manipulator. The connecting member 32 is provided with a rotating shaft 321 and is drivably connected to the first driving member 31 via the rotating shaft 321, so that the first driving member 31 can drive the connecting member 32 and the gripping member 33 to move and turn over, so as to adjust the state of the gripped battery cell.

The gripping member 33 can realize the gripping and release of the battery cell, so as to grip the battery cell from the bearing position 11 and then release it on the stacking station 21. A second driving member 322 that is drivably connected to the gripping member 33 may be provided on the connecting member 32, and the second driving member 322 can drive the gripping member 33 to grip or release the battery cell. In addition, the second driving member 322 may be, without limitation, provided as a driving cylinder.

By providing the gripping member 33, gripping and releasing of the battery cell can be realized so as to place the battery cell on the stacking station 21. By providing the first driving member 31, the gripped battery cell can be brought along to turn over, so that the battery cell can turn over from the flat state on the bearing position 11 to the state with the electrode terminals facing upwards, so as to facilitate stacking and arrangement on the stacking station 21.

In some embodiments, the gripping member 33 includes at least two sub-members 331 arranged at intervals along a first direction a on the connecting member 32, and each sub-member 331 includes at least two jaws 332 arranged at intervals along a second direction b intersecting the first direction a. Each jaw 332 in at least one sub-member 331 is rotatably arranged on the connecting member 32.

Specifically, the gripping member 33 includes two sub-members 331 arranged at an interval along the first direction a on the connecting member 32, and each sub-member 331 includes a first jaw 332 and a second jaw 332 arranged at an interval along the second direction b, and the first direction a is perpendicular to the second direction b. When the battery cell on the gripping member 33 remains in the state with the electrode terminals facing upwards, the first direction a and the second direction b are respectively two directions perpendicular to each other in the horizontal plane.

Further, once the gripping member 33 is driven by the first driving member 31 to turn over, the battery cells clamped by all the first jaws 332 and all the second jaws 332 are all in the state with the electrode terminals facing upwards. At this time, the large surfaces with sticked tape of the battery cells clamped by the two first jaws 332 are arranged opposite to each other, and the large surfaces with sticked tape of the battery cells clamped by the two second jaws 332 are arranged opposite to each other.

The first jaw 332 and the second jaw 332 of one of the two sub-members 331 are rotated by 180°, so that the large surface with sticked tape of the battery cell on the first jaw 332 of one sub-member 331 is arranged opposite to the large surface without sticked tape of the battery cell on the first jaw 332 of the other sub-member 331, and the large surface with sticked tape of the battery cell on the second jaw 332 of one sub-member 331 is arranged opposite to the large surface without sticked tape of the battery cell on the second jaw 332 of the other sub-member 331.

As such, when the gripping member 33 places the battery cells on the stacking station 21 for arrangement, the large surface with sticked tape of the previous battery cell is adhered to the large surface without sticked tape of the subsequent battery cell along the arrangement direction of the battery cells.

It can be understood that each jaw 332 can be, without limitation, rotatably arranged on the connecting member 32 via a rotating cylinder.

With the above-mentioned structure, the surfaces on the side with sticked tape of all the battery cells gripped by the gripping member 33 can be arranged to face the same direction, so that when the battery cells are placed on the stacking station 21, every two adjacent battery cells can be bonded and fixed to each other by the sticked tape.

In some embodiments, each jaw 332 includes two clamping members 3321 arranged at an interval along the second direction b, where at least one of the clamping members 3321 is movably arranged on the connecting member 32 along the second direction b.

Each clamping jaw 332 can realize the clamping and releasing of a battery cell, that is, the two clamping members 3321 in each clamping jaw 332 can approach or move away from each other along the second direction b, and when the two corresponding clamping members 3321 approach each other, the battery cell can be clamped. When the two corresponding clamping members 3321 move away from each other, the clamped battery cell can be released.

With the above structure, the distance between the two clamping members 3321 in the second direction b can be adjusted, so that each jaw 332 can be used to clamp battery cells of different dimensions.

In some embodiments, all the jaws 332 in at least one sub-member 331 are movably arranged along the first direction a.

In the process of gripping the battery cells by the gripping member 33, in order to prevent the battery cells from interacting with each other, for example, in order that some of the battery cells being gripped will not collide with other battery cells during rotation, a large distance is present between the sub-members 331. However, when the battery cells are being placed on the stacking station 21, in order to facilitate subsequent stacking, a small distance is generally present between adjacent battery cells in the arrangement direction of the battery cells.

Therefore, before placing the battery cells on the stacking station 21, all the jaws 332 in one of the sub-members 331 are moved along the first direction a until a distance of about 10 mm is present between the large surfaces of two adjacent battery cells, so as to place the battery cells on the stacking station 21.

Specifically, the jaws 332 can be movably arranged on the connecting member 32 via a pitch-variable cylinder and a slider. The slider is connected between the pitch-variable cylinder and the corresponding jaw 332. Driven by the pitch-variable cylinder, the gripping member 332 moves along the first direction a, thereby adjusting the distance between adjacent battery cells in the first direction a.

With the above-mentioned structure, before the battery cells are placed on the stacking station 21, first the distance between the adjacent battery cells in the first direction a is adjusted by moving the jaws 332, so that the battery cells can be placed on the stacking station 21 more smoothly.

Figure 5:
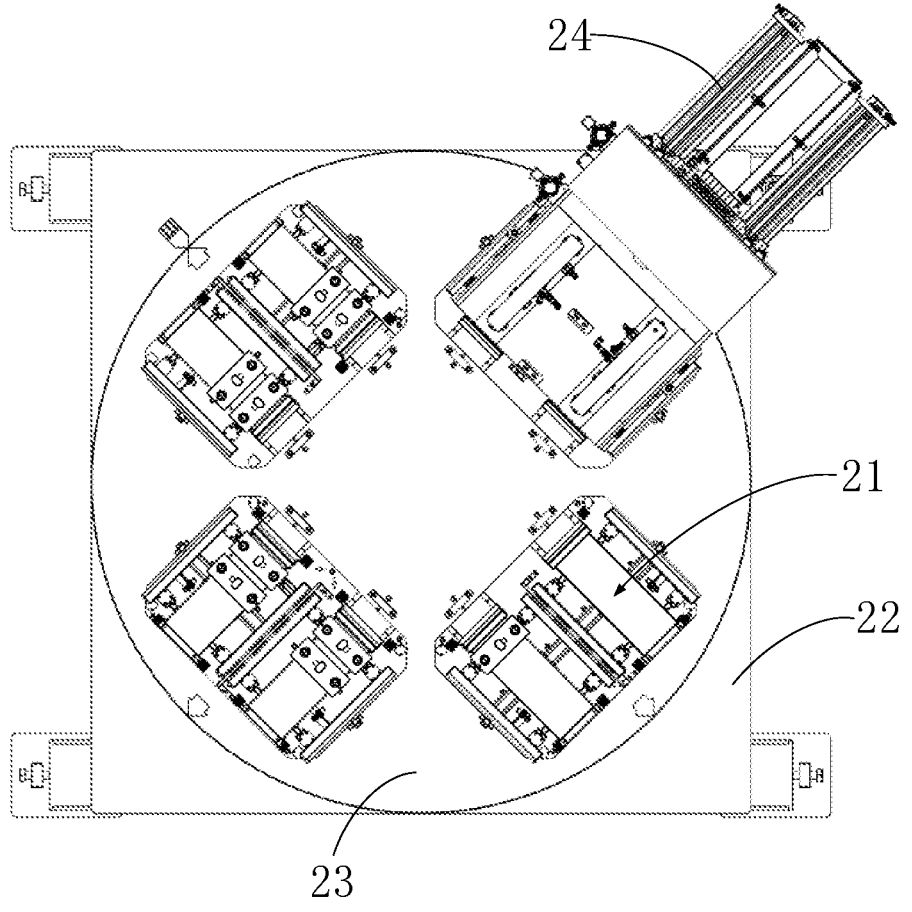
FIG. 5 is a schematic structural view of a pre-stacking platform in a pre-stacking device according to one or more embodiments.

As shown in FIG. 5, in some embodiments, the pre-stacking platform 20 includes a base 22, a supporting member 23 and a pressing mechanism 24, the supporting member 23 is rotatably arranged on the base 22, and the pressing mechanism 24 is arranged on the base 22 and located on one side of the supporting member 23. At least two stacking stations 21 are provided at intervals on the supporting member 23 along the circumferential direction thereof, and the supporting member 23 is configured to be capable of allowing a different stacking station 21 to be arranged opposite to the pressing mechanism 24 through rotation. The pressing mechanism 24 is used to exert a force on the battery cells in the stacking station 21 opposite to the pressing mechanism that causes the battery cells to approach each other along the arrangement direction of the battery cells.

Specifically, the base 22 can provide a basis for installation and support for the supporting member 23 and the pressing mechanism 24. The supporting member 23 can be but is not limited to be provided as a turntable. Four stacking stations 21 are arranged at intervals on the supporting member 23 along the circumferential direction thereof. When one of the stacking stations 21 rotates along with the supporting member 23 so as to be arranged opposite to the pressing mechanism 24, the pressing mechanism 24 can exert a force on the multiple battery cells stacked on the stacking station 21 that causes the battery cells to approach each other along the arrangement direction of the battery cells, so that the multiple battery cells can be adhered to each other and bonded and fixed to each other by the sticked tape.

Multiple stacking stations 21 are provided on the supporting member 23, so that stacking of multiple groups of battery cells can be realized simultaneously, thereby improving the stacking efficiency. In addition, through the rotation of the supporting member 23, the stacking stations 21 thereon are brought along to be arranged opposite to the pressing mechanism 24 in sequence, and the pressing mechanism 24 can exert a force on the battery cells in the stacking station 21 opposite to the pressing mechanism that causes the battery cells to approach each other along the arrangement direction of the battery cells, so that the multiple battery cells can be adhered to each other and bonded and fixed to each other by the sticked tape.

Based on the same concept as the above-mentioned pre-stacking device 100, the present application further provides a battery processing equipment including the pre-stacking device 100 as described above.

Figure 6:
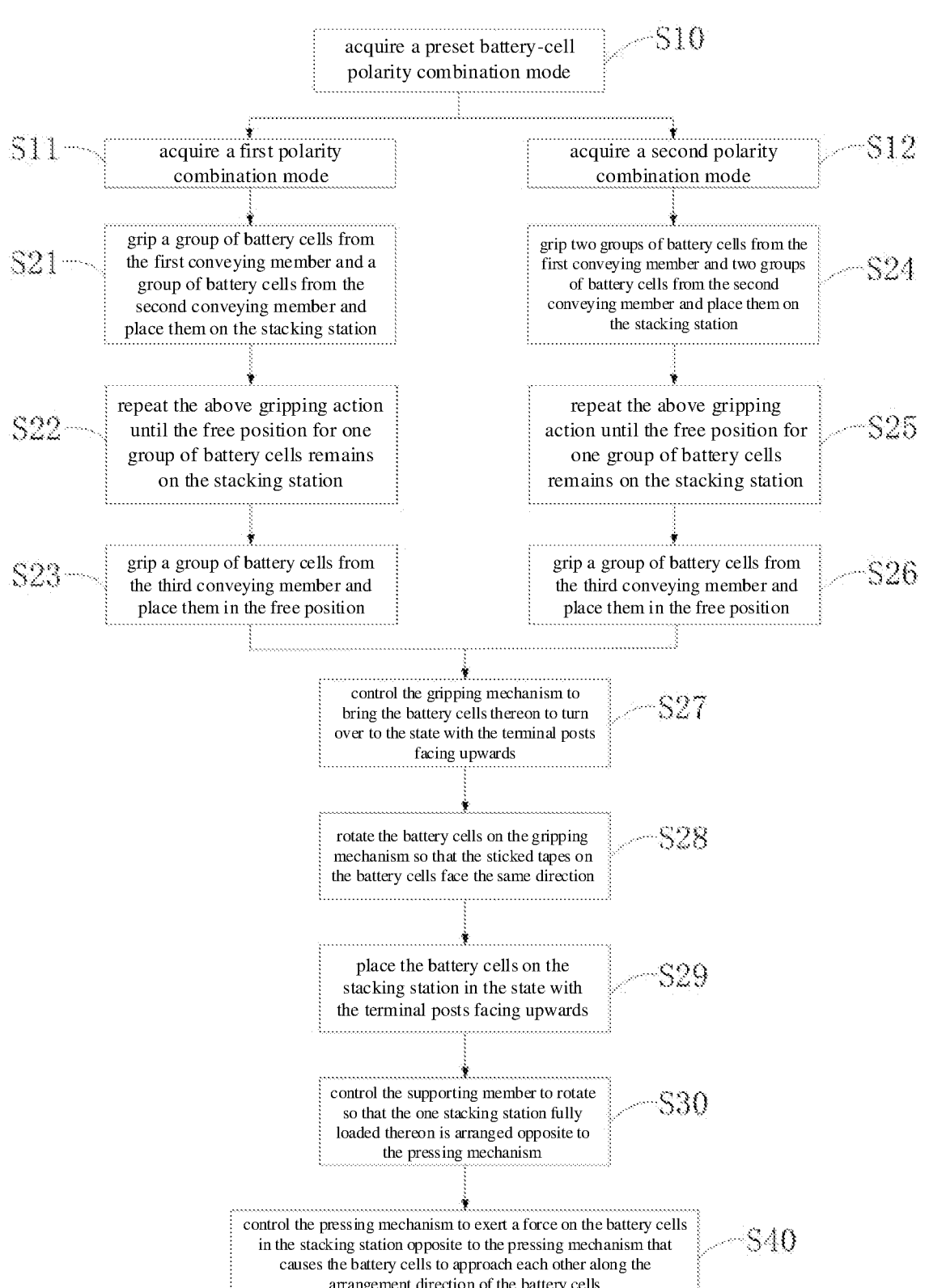
FIG. 6 is a flowchart of a pre-stacking method according to one or more embodiments.

As shown in FIG. 6, based on the same concept as the above-mentioned pre-stacking device 100, the present application further provides a pre-stacking method including the following steps.

S10: A preset battery-cell polarity combination mode is acquired. The preset battery-cell polarity combination mode means that the positive and negative electrodes of the battery cells to be stacked and arranged are arranged according to the preset rules required for production.

Specifically, by providing the controller and communicatively connecting the gripping mechanism 30 with the controller, the battery-cell polarity combination mode required for production is preset in the controller.

S20: In response to the acquired battery-cell polarity combination mode, the gripping mechanism 30 is controlled to grip corresponding battery cells from each conveying member 10 and place them on the stacking station 21.

In pre-stacking of the battery cells, the gripping mechanism 30 acquires the preset battery-cell polarity combination mode from the controller, and grips corresponding battery cells from the corresponding conveying member 10 according to the acquired battery-cell polarity combination mode and places them on the stacking station 21, so that the battery cells are stacked and arranged according to the preset battery-cell polarity combination mode.

In some embodiments, the step S10 of acquiring a preset battery-cell polarity combination mode further includes the following step.

S11: A first polarity combination mode is acquired, where in the first polarity combination mode, the polarities of the adjacent battery cells are alternately arranged.

In the first polarity combination mode, referred to as 1P, the polarities of every two adjacent battery cells are opposite and are alternately arranged along the arrangement direction of the battery cells. For example, four battery cells are arranged in sequence. The positive electrode of the first battery cell is on the left and the negative electrode is on the right. The positive electrode of the second battery cell is on the right and the negative electrode is on the left. The positive electrode of the third battery cell is on the left and the negative electrode is on the right. The positive electrode of the fourth battery cell is on the right and the negative electrode is on the left. Thus, the four battery cells are stacked and arranged according to the first battery-cell polarity combination mode.

In some embodiments, the step S20 of in response to the acquired battery-cell polarity combination mode, controlling the gripping mechanism 30 to grip corresponding battery cells from each conveying member 10 and place them on the stacking station 21 further includes the following step.

S21: In response to the acquired first polarity combination mode, a group of battery cells is gripped from the first conveying member 12 and placed on the stacking station 21, and a group of battery cells is gripped from the second conveying member 13 and placed on the stacking station 21.

When the gripping mechanism 30 acquires the information about the first polarity combination mode from the controller, the gripping mechanism 30 first grips a group of battery cells from the first conveying member 12 and places them on the stacking station 21, and then grips a group of battery cells with polarity opposite to that of the previous group of battery cells from the second conveying member 13 and places them on the stacking station 21.

It should be noted that, in order to improve the efficiency of battery cell stacking, usually two battery cells are placed side by side on each bearing position 11, or even three or more battery cells are placed side by side. A corresponding number of gripping members 33 are provided on the gripping mechanism 30, and when the gripping mechanism 30 grips the battery cells from the first conveying member 12, the second conveying member 13 or the third conveying member 14, each gripping member 33 grips correspondingly one battery cell in a group, so that two or more battery cells in a group are gripped at the same time. Accordingly, a corresponding number of sub-stations can be arranged in each stacking station 21, and the number of sub-stations matches the number of battery cells in each battery cell group, so that all the battery cells in each group can be placed in all the sub-stations of each stacking station 21 in one-to-one correspondence.

In the following, for the convenience of explanation, description will be made by taking each group including two battery cells placed side by side as an example. That is, when the gripping mechanism 30 acquires information about the first polarity combination mode from the controller, the gripping mechanism 30 first grips two battery cells in a group from the first conveying member 12, and then grips two battery cells in a group from the second conveying member 13, and then places them in the stacking station 21 in sequence according to the arrangement direction.

S22: The above gripping action is repeated until the free position for a group of battery cells remains on the stacking station 21.

Specifically, when there are N groups of battery cells to be stacked and arranged, a total of N−1 groups of battery cells are gripped in sequence from the first conveying member 12 and the second conveying member 13, and placed in sequence on the stacking station 21.

S23: A group of battery cells is gripped from the third conveying member 14 and placed in the free position on the stacking station 21, where the polarity of the group of battery cells gripped from the third conveying member 14 is opposite to that of the group of battery cells adjacent thereto.

The battery cells without sticked tape are placed on the third conveying member 14, and finally a group of battery cells is gripped from the third conveying member 14 and placed in the last free position of the stacking station 21, so that stacking of all the battery cells is completed, and every two adjacent battery cells are bonded and fixed to each other by the sticked tape.

In order to meet the requirements of the first polarity combination mode, when the battery cells finally gripped from the third conveying member 14 are placed on the stacking station 21, the polarity of the battery cells is opposite to that of the previous group of battery cells. As such, when all the battery cells are stacked and arranged on the stacking station 21, the polarities of every two adjacent battery cells are opposite and are alternately arranged.

In some embodiments, the step S10 of acquiring a preset battery-cell polarity combination mode further includes the following step.

S12: A second polarity combination mode is acquired, where in the second polarity combination mode, two adjacent battery cells are treated as a unit, and the polarities of the adjacent units are alternately arranged.

In the second polarity combination mode, referred to as 2P, two adjacent battery cells along the arrangement direction of the battery cells form a unit, the two battery cells in each unit have the same polarity, and the polarities of every two adjacent units are opposite and are alternately arranged.

For example, four battery cells are arranged in sequence. The positive electrode of the first battery cell is on the left and the negative electrode is on the right. The positive electrode of the second battery cell is on the left and the negative electrode is on the right. The positive electrode of the third battery cell is on the right and the negative electrode is on the left. The positive electrode of the fourth battery cell is on the right and the negative electrode is on the left. Thus, the four battery cells are stacked and arranged according to the second polarity combination mode.

In some embodiments, the step S20 of in response to the acquired battery-cell polarity combination mode, controlling the gripping mechanism 30 to grip corresponding battery cells from each conveying member 10 and place them on the stacking station 21 further includes the following step.

S24: In response to the acquired second polarity combination mode, two groups of battery cells are gripped from the first conveying member 12 and placed on the stacking station 21, and two groups of battery cells are gripped from the second conveying member 13 and placed on the stacking station 21.

The polarities of the two groups of battery cells gripped from the second conveying member 13 are opposite to those of the two groups of battery cells gripped from the first conveying member 12.

S25: The above gripping action is repeated until the free position for a group of battery cells remains on the stacking station 21.

S26: A group of battery cells is gripped from the third conveying member 14 and placed in the free position on the stacking station 21, where the polarity of the group of battery cells gripped from the third conveying member 14 is the same as that of the group of battery cells adjacent thereto.

Through the above steps, if N groups of battery cells are to be stacked and arranged, first, a total of N−1 groups of battery cells with sticked tape are gripped from the first conveying member 12 and the second conveying member 13 and placed on the stacking station 21 for arrangement. Then the last group of battery cells without sticked tape is gripped from the third conveying member 14 and placed on the last free position on the stacking station 21. All the battery cells are stacked in sequence along the arrangement direction, and every two adjacent battery cells are bonded and fixed to each other by the sticked tape.

In order to meet the requirements of the second polarity combination mode, the battery cells gripped from the third conveying member 14 are placed on the stacking station 21 in such a manner that the polarity thereof is the same as that of the previous group of battery cells. Therefore, when all the battery cells are stacked and arranged on the stacking station 21, two adjacent battery cells form a unit, the two battery cells in each unit have the same polarity, and the polarities of every two adjacent units are opposite and are alternately arranged.

In some embodiments, the step S20 of in response to the acquired battery-cell polarity combination mode, controlling the gripping mechanism 30 to grip corresponding battery cells from each conveying member 10 and place them on the stacking station 21 further includes the following step.

S27: The gripping mechanism 30 is controlled to bring the battery cells thereon to turn over, so that the battery cells turn over from the flat state to the state with the electrode terminals facing upwards.

On the conveying member 10, the battery cells are placed in the flat state, that is, the battery cells are arranged with its large surface facing upwards. Therefore, after the gripping mechanism 30 grips the battery cells, it first brings the battery cells to turn over by 90°, so that the battery cells turn over from the flat state to the state with the electrode terminals facing upwards, so that it can be placed on the stacking station 21 for stacking and arrangement.

S28: The battery cells on the gripping mechanism 30 are rotated so that the sticked tape on each battery cell faces the same direction.

After turning over, the large surfaces on the side with sticked tape of the battery cells are all arranged to face inwards, that is, the large surfaces with sticked tape of the battery cells are arranged to face each other. Therefore, by rotating the battery cells, the large surfaces with sticked tape of the battery cells are all arranged to face the same direction. Then they are placed on the stacking station 21 in sequence, so that two adjacent battery cells can be bonded and fixed to each other by the sticked tape on the large surface of the previous battery cell.

S29: The battery cells are placed on the stacking station 21 in the state with the electrode terminals facing upward.

In some embodiments, after the step S20 of in response to the acquired battery-cell polarity combination mode, controlling the gripping mechanism 30 to grip corresponding battery cells from each conveying member 10 and place them on the stacking station 21, the method further includes the following step.

S30: The supporting member 23 is controlled to rotate so that one of the stacking stations 21 on the supporting member 23 having battery cells placed thereon is arranged opposite to the pressing mechanism 24.

After placing of the battery cells is completed on one of the stacking stations 21, this stacking station 21 is rotated to be arranged opposite to the pressing mechanism 24. As such, the pressing mechanism 24 can press the battery cells on this stacking station 21 to make them adhere closely to each other, thus completing the pre-stacking operation. At the same time, the gripping mechanism 30 can synchronously place battery cells on other stacking stations 21 that are not arranged opposite to the pressing mechanism 24, thereby improving the efficiency battery cell pre-stacking.

S40: The pressing mechanism 24 is controlled to exert a force on the battery cells in the stacking station 21 opposite to the pressing mechanism that causes the battery cells to approach each other along the arrangement direction of the battery cells.

Under the force from the pressing mechanism 24, the battery cells approach each other along their arrangement direction, and are bonded and fixed with the sticked tape on the large surface.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not cause the essence of the corresponding technical solutions to depart from the scope of the technical solutions of the various embodiments of the present application, and shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A pre-stacking method comprising the steps of:

acquiring a preset battery-cell polarity combination mode, the acquiring the preset battery-cell polarity combination mode further comprising acquiring a first polarity combination mode, wherein in the first polarity combination mode, polarities of adjacent battery cells are alternately arranged; and in response to the acquired battery-cell polarity combination mode being the first polarity combination mode, controlling a gripping mechanism to:

grip a group of battery cells from a first conveying member and place the group of battery cells from the first conveying member on a stacking station, and grip a group of battery cells from a second conveying member and place the group of battery cells from the second conveying member on the stacking station, the group of battery cells from the first conveying member and the group of battery cells from the second conveying member each having sticked tape;

repeat the above gripping action until a free position for a single group of battery cells remains on the stacking station; and grip a group of battery cells from a third conveying member and place the group of battery cells from the third conveying member in the free position on the stacking station, a polarity of the group of battery cells from the third conveying member is opposite to that of the group of battery cells adjacent thereto, the group of battery cells from the third conveying member not having sticked tape, such that every two adjacent battery cells on the stacking station are bonded and fixed to each other by the corresponding sticked tape on one of the two adjacent battery cells.

2. The pre-stacking method according to claim 1, wherein the step of acquiring a preset battery-cell polarity combination mode further comprises:

acquiring a second polarity combination mode, wherein in the second polarity combination mode, two adjacent battery cells are treated as a unit, and the polarities of the adjacent units are alternately arranged.

3. The pre-stacking method according to claim 2, further comprising:

in response to the acquired polarity combination mode being the second polarity combination mode, controlling the gripping mechanism to:

grip two groups of battery cells from the first conveying member and place them on the stacking station, and grip two groups of battery cells from the second conveying member and place them on the stacking station;

repeat the above gripping action until the free position for a single group of battery cells remains on the stacking station; and grip a group of battery cells from the third conveying member and place them in the free position on the stacking station, wherein the polarity of the group of battery cells gripped from the third conveying member is the same as that of the group of battery cells adjacent thereto.

4. The pre-stacking method according to claim 1, further comprising:

controlling the gripping mechanism to bring the battery cells thereon to turn over, so that the battery cells turn over from a flat state to a state with electrode terminals facing upwards;

rotating the battery cells on the gripping mechanism so that sticked tape on each battery cell faces a same direction; and placing, on the stacking station, the battery cells in the state with the electrode terminals facing upwards.

5. The pre-stacking method according to claim 1, further comprising, after the step of in response to the acquired battery-cell polarity combination mode, controlling a gripping mechanism to grip corresponding battery cells from each conveying member and place them on a stacking station, the step of:

controlling the supporting member to rotate so that one of the stacking stations on the supporting member having the battery cells placed thereon is arranged opposite to a pressing mechanism; and controlling the pressing mechanism to exert a force on the battery cells in the stacking station opposite to the pressing mechanism that causes the battery cells to approach each other along the arrangement direction of the battery cells.

* * * * *